(12) United States Patent
Gomadam et al.

(10) Patent No.: US 9,948,408 B1
(45) Date of Patent: Apr. 17, 2018

(54) ANTENNA ARRAY CALIBRATION

(71) Applicant: Facebook, Inc., Menlo Park, CA (US)

(72) Inventors: Krishna Srikanth Gomadam, San Jose, CA (US); William Charles Fujimoto, San Jose, CA (US); Djordje Tujkovic, Mountain View, CA (US); Sanjai Kohli, Manhattan Beach, CA (US)

(73) Assignee: Facebook, Inc., Menlo Park ( * ) Notice: Subject to any disclaimer, the term of this patent is extended or adjusted under 35 U.S.C. 154(b) by 0 days.

(21) Appl. No.: 15/584,130

(22) Filed: May 2, 2017

(51) Int. Cl.
*H04B 7/02* (2017.01)
*H04B 17/12* (2015.01)
*H01Q 21/22* (2006.01)
*H01Q 3/26* (2006.01)
*H04B 7/06* (2006.01)

(52) U.S. Cl.
CPC ............. *H04B 17/12* (2015.01); *H01Q 3/267* (2013.01); *H01Q 21/22* (2013.01); *H04B 7/0608* (2013.01)

(58) Field of Classification Search
CPC ...... H04B 17/12; H04B 7/0608; H01Q 3/267; H01Q 21/22

USPC .......................................................... 455/101
See application file for complete search history.

(56) References Cited

U.S. PATENT DOCUMENTS

| 8,754,811 B1 | 6/2014 | Uscinowicz et al. |
| 2010/0123625 A1 | 5/2010 | Martin et al. |
| 2012/0146840 A1* | 6/2012 | Ookawa ............... G01S 7/4004 342/165 |
| 2016/0329952 A1 | 11/2016 | Smart et al. |

* cited by examiner

*Primary Examiner* — Sanh Phu
(74) *Attorney, Agent, or Firm* — Brian R. Short

(57) ABSTRACT

Apparatuses, methods, and systems for calibrating an antenna array are disclosed. One method includes selecting an antenna element of a first antenna subarray and an antenna element of a second antenna subarray, transmitting the signal through the at least one antenna element of the first subarray having a first selected phase, transmitting the signal through the at least one antenna element of the second subarray having a second selected phase, and characterizing a relative phase offset between the antenna element of the first antenna subarray and the antenna element of the second antenna subarray, including adjusting the first selected phase or the second selected phase, and monitoring a receive signal received at a calibration antenna that includes the transmitted signal of the at least one antenna element of the first antenna subarray and the transmitted signal of the at least one antenna element of second antenna subarray.

20 Claims, 10 Drawing Sheets

Selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit
510

Receiving by the first slave circuit a signal from a master circuit through a first port of the master circuit
520

Receiving by the second slave circuit the signal from the master circuit through a second port of the master circuit
530

Transmitting the signal through the at least one antenna element of the first subarray having a first selected phase
540

Transmitting the signal through the at least one antenna element of the second subarray having a second selected phase
550

Characterizing a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna
560

FIGURE 5

Selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit
610

Receiving a signal through the at least one antenna element of the first antenna subarray from a calibration antenna
620

Communicating, by the first slave circuit, the received signal to a master circuit through a first port of the master circuit
630

Phase adjusting the received signal with a first selected phase
640

Receiving the signal through the at least one antenna element of the second subarray from the calibration antenna
650

Communicating, by the second slave circuit, the received signal to the master circuit through a second port of the master circuit
660

Phase adjusting the received signal with a second selected phase
670

Characterizing a relative phase offset between the at least one antenna element of the first antenna subarray and the at least one antenna element of the second antenna subarray, comprising adjusting at least one of the first selected phase and the second selected phase, and monitoring the signal received by the at least one antenna element of the first subarray and the signal received by the at least one antenna element of second subarray
680

FIGURE 6

ANTENNA ARRAY CALIBRATION

FIELD OF THE DESCRIBED EMBODIMENTS

The described embodiments relate generally to wireless communications. More particularly, the described embodiments relate to systems, methods and apparatuses for calibrating an antenna array.

BACKGROUND

Arrays of antennas can be used for forming beams to facilitate communication between wireless devices. Directions of the formed beams can be controlled by adjusting the phase of the wireless signals being communication through the beams.

It is desirable to have methods apparatuses, and systems for calibrating relative phase offsets between antenna elements of an antenna array.

SUMMARY

An embodiment includes a method. The method includes selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit, receiving by the first slave circuit a signal from a master circuit through a first port of the master circuit, receiving by the second slave circuit the signal from the master circuit through a second port of the master circuit, transmitting the signal through the at least one antenna element of the first subarray having a first selected phase, transmitting the signal through the at least one antenna element of the second subarray having a second selected phase, and characterizing a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

An embodiment includes another method. The method includes selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit, receiving a signal through the at least one antenna element of the first antenna subarray from a calibration antenna, communicating, by the first slave circuit, the received signal to a master circuit through a first port of the master circuit, phase adjusting the received signal with a first selected phase, receiving the signal through the at least one antenna element of the second subarray from the calibration antenna, communicating, by the second slave circuit, the received signal to the master circuit through a second port of the master circuit, phase adjusting the received signal with a second selected phase, and characterizing a relative phase offset between the at least one antenna element of the first antenna subarray and the at least one antenna element of the second antenna subarray, comprising adjusting at least one of the first selected phase and the second selected phase, and monitoring the signal received by the at least one antenna element of the first subarray and the signal received by the at least one antenna element of second subarray.

Another embodiment includes an apparatus. The apparatus includes a plurality of antenna sub-arrays, each subarray comprising a plurality of antenna elements, each antenna element operative to transmit a corresponding signal, wherein each antenna element is electrically connected through a conductive trace to a slave circuit. The apparatus further includes a master circuit, the master circuit electrically connected to each of the plurality of slave circuits through a corresponding conductive trace. Further, one or more controllers are operative select at least one antenna element of a first antenna subarray of the plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit. The first slave circuit is operative to receive a signal from the master circuit through a first port of the master circuit, and the second slave circuit is operative to receive the signal from the master circuit through a second port of the master circuit. The at least one antenna element of the first subarray is operative to transmit the signal having a first selected phase, and the at least one antenna element of the second subarray is operative to transmit the signal having a second selected phase. Further, the one or more controllers are further operative to characterize a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

Another embodiment includes an apparatus. The apparatus includes a plurality of antenna subarrays, each and subarray comprising a plurality of antenna elements, each antenna element operative to transmit a corresponding signal, wherein each antenna element is electrically connected to a slave circuit. The apparatus further includes a master circuit, the master circuit electrically connected to each of the plurality of slave circuits. Further, one or more controllers are operative to select at least one antenna element of a first antenna subarray of the plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit. Further, the first slave circuit is operative to receive a signal from the master circuit through a first port of the master circuit, the second slave circuit is operative to receive the signal from the master circuit through a second port of the master circuit, the at least one antenna element of the first subarray is operative to transmit the signal having a first selected phase, and the at least one antenna element of the second subarray is operative to transmit the signal having a second selected phase. Further, the one or more controllers are further operative to characterize a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes acts of a method of calibrating an array of antennas, according to an embodiment.

FIG. 6 is a flow chart that includes acts of a method of calibrating an array of antennas, according to an embodiment.

DETAILED DESCRIPTION

The embodiments described include methods, apparatuses, and systems for characterizing a relative phase offsets between antennas of an array of antennas, wherein each of the antennas is connected to one of multiple slave circuits, and the multiple slave circuits are connected to a master circuit. An embodiment includes an array of antenna elements operative to generate a beam for wireless communication. For an embodiment, the array of antenna elements is divided up into subarrays of antenna elements, wherein each subarray is associated with slave circuit, and wherein each slave circuit is electrically connected to a master circuit. In order to properly form beams with the array of antenna elements, relative phase offsets between the antenna elements should be characterized. For at least some embodiments, characterizations of the relative phase offsets are stored. For an embodiment, the stored characterizations are retrieved to aid the formation of beams by the array of antenna elements.

Figure 1:
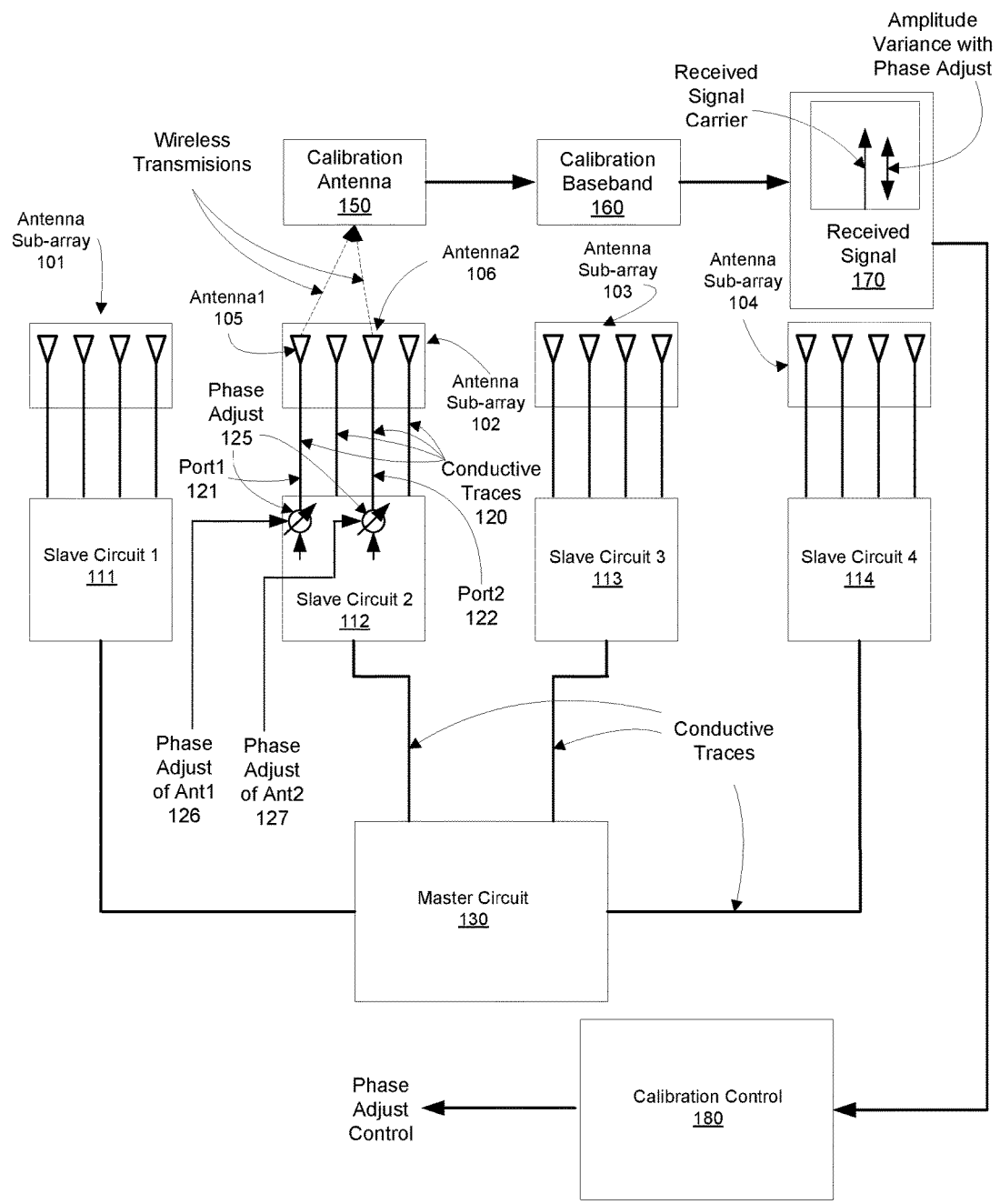
FIG. 1 shows an apparatus for characterizing an array of antenna elements, according to an embodiment.

FIG. 1 shows an apparatus for characterizing an array of antennas elements, according to an embodiment. As shown, the array of antenna elements include a plurality of antenna subarrays 101, 102, 103, 104 that are each connected to corresponding slave circuits 111, 112, 113, 114. Generally, the antenna subarrays 101, 102, 103, 104 are electrically connected to the slave circuits 111, 112, 113, 114 through conductive traces, lines or waveguides (such as, conductive traces 120). These conductive traces introduce time delays of signals communicated between the slave circuits 111, 112, 113, 114 and the antenna subarrays 101, 102, 103, 104, which cause corresponding phase shifts of the signals communicated between the slave circuits 111, 112, 113, 114 and the antenna subarrays 101, 102, 103, 104. Further, the time delays or phase shifts of the communicated signal are not consistent from one conductive trace to the other. That is, a first conductive trace between a slave circuit and a first antenna element of a first antenna subarray will cause a phase delay of a communication signal between the slave circuit and the first antenna element that is different than a phase delay of a communication signal between the slave circuit and a second antenna element of the first antenna subarray.

Further, circuitry within a slave circuit can additionally add a phase shift to the signals communicated between the slave circuit and antenna elements electrically connected to the slave circuit. This phase shift can vary from each connection between the slave circuit and each antenna element connected to the slave circuit.

For an embodiment, the array of antennas is operative to form directional beams that facilitate wireless communication. For an embodiment, the directions of the beams that are formed is at least partially controlled by phase shifting or time delaying the signals that are wirelessly transmitted from each of the antenna elements of the array of antenna. Accordingly, the phase delay or the time delay of the signals transmitted from the antenna elements of the array of antennas needs to be precisely characterized and controlled. Further, any time delays or phase delays introduced to the signals after selecting and accordingly processing the desired time or phase delays needed to form a directional beam need to be fully characterized. Further, variations of the time delays or phase delays introduced to each signal of each different antenna element can be characterized. At least some of the described embodiments include characterization of the time delays or phase delays (relative phase offset) caused by the propagation of signals from the slave circuits for transmission over the conductive traces located between the slave circuits 111, 112, 113, 114 and the antenna subarrays 101, 102, 103, 104.

Further, at least some of the described embodiments include characterization of the time delays or phase delays caused by the propagation of signals for transmission over the conductive traces located between the slave circuits 111, 112, 113, 114 and a master circuit 130.

For an embodiment, the slave circuits 111, 112, 113, 114 include one or more RFICs (radio frequency integrated circuits). For an embodiment, the master circuit 130 includes a master RFIC.

As shown in FIG. 1, a calibration antenna 150 is operative to receive wireless signals transmitted from antenna elements of the array of antennas. For example, the calibration antenna 150 can receive wireless signals transmitted from a first antenna element 105 and a second antenna element 106. Further, the received wireless signals are demodulated within a calibration baseband radio 160, and the received signals are observed (received signal 170). Effectively, the received signal 170 can be observed, for example, on a spectrum analyzer that depicts the amplitude of the received signal at a particular frequency. If the wireless signals transmitted from the first antenna element 105 and the second antenna element 106 have the same carrier frequency (that is, the same signal wherein each of the antenna elements 105, 106 included phase shifted representations of the signal), then the received signal 170 will include a signal frequency, and the amplitude of the received signal 170 will vary depending upon the phase relationship between the wireless signals transmitted from the first antenna element 105 and the second antenna element 106. As shown, the first antenna element 105 is electrically connected to the slave circuit 112 through a first port (Port1) 121, and the second antenna element 106 is electrically connected to the slave circuit 112 through a second port (Port2) 122.

The relative phase offset of signals due to circuitry of the slave circuit 2 112 and due to the time delay of the conductive line between the slave circuit 2 112 and the first antenna element 105 and due to the time delay of the conductive line between the slave circuit 2 112 and the second antenna element 106 can be characterized by monitoring the received signal 170 while a controller 180 adjusts the phase offset (125) of the signal transmitted by the first antenna element 105 and the second antenna element 106 through, for example, phase adjust controls 126, 127. For an embodiment, the amplitude of the received signal 170 is highest when the phase delay is adjusted to compensate for the differences in the phase delay between the two conductive traces. The values or settings of the phase adjust controls 126, 127 can be stored for future reference.

The relative phase offset of each of the conductive traces between the slave circuit 2 112 and each antenna element of the antenna subarray 102 can be determined by repeating the phase adjustment of each of the signals propagated through a reference antenna and each other antenna element of the antenna subarray 102 while monitoring the received signal 170. That is, the phase offset of each connection of each other antenna element relative to the selected phase of the signal transmitted through the reference antenna element is determined.

For an embodiment, the conductive traces, and therefore the time delay or phase delay between each slave circuit 111, 112, 113, 114 and the corresponding antenna subarray 101, 102, 103, 104 are nearly identical. That is, the design and layout of each slave circuit the connection to the corresponding antenna element of the antenna subarray is repeated for each other slave circuit and antenna subarray. Therefore, the relative phase offset of the connections between the slave circuits and the antenna element each of antenna subarrays can be assumed to be the same. Therefore, the time delay or phase delay can be characterized for one slave circuit/subarray combination, and the time delay or phase delay for all of the other slave circuit/subarray combinations can be assumed to be the same. That is, one of the subarrays is characterized, and that characterization is designated as the "gold standard" that can be used for the other subarrays. The gold standard can be based on a characterization of one subarray, an average (or other statistical combination) of multiple subarrays, or an average (or other statistical combination) of one or more subarrays over time.

Figure 2:
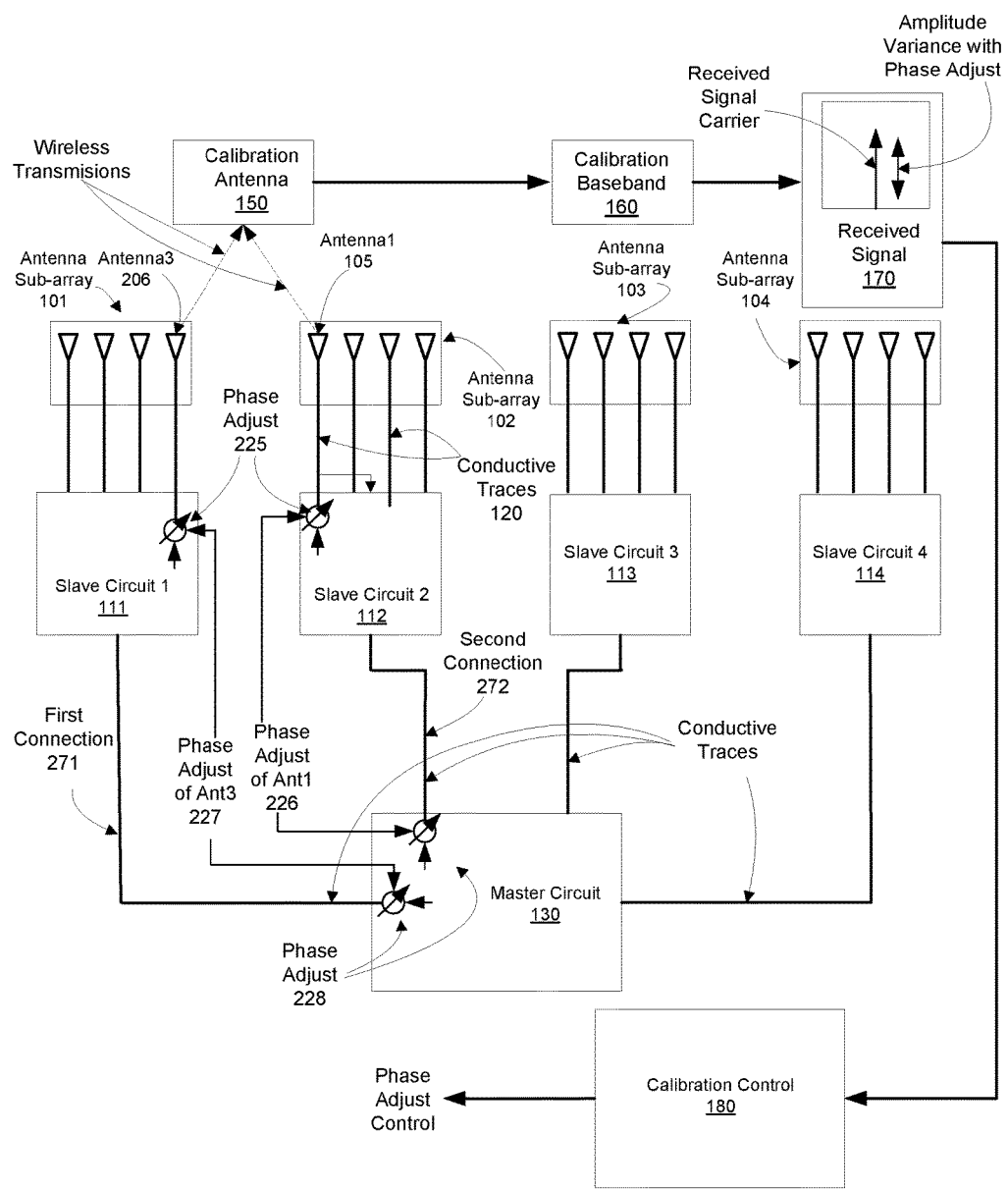
FIG. 2 shows another apparatus for characterizing an array of antenna elements, according to another embodiment.

FIG. 2 shows another apparatus for characterizing an array of antenna elements, according to another embodiment. For an embodiment, an antenna element from two different antenna subarrays are selected for characterizing a time delay or phase delay (relative phase offset) of signal propagated through conductive traces between the master circuit 130 and each slave circuit 111, 112, 113, 114, and time or phase delay introduces by circuitry of the master circuit 130 and slave circuits. For example, the first antenna element 105 of the antenna subarray 102 is selected, and another antenna element (Antenna3) 206 from the antenna subarray 101 is selected.

For an embodiment, wireless signals simultaneously transmitted from the first antenna element 105 of the antenna subarray 102 and the other antenna element (Antenna3) 206 from the antenna subarray 101 are received by the reference antenna 150. For an embodiment, the time delay or phase delay of the conductive traces 271, 272 between the master circuit 130 and the slave circuit 1 111 and the master circuit 130 and the slave circuit 2 112 are characterized by adjusting the phase of the wireless signals simultaneously transmitted from the first antenna element 105 of the antenna subarray 102 and the other antenna element (Antenna3) 206 from the antenna subarray 101 while observing or monitoring the received signal 170.

For an embodiment, the phase of the wireless signals simultaneously transmitted from the first antenna element 105 of the antenna subarray 102 and the other antenna element (Antenna3) 206 from the antenna subarray 101 is adjusted by adjusting the phase of the wireless signals within the master circuit 130 as shown by the phase adjust 228. For an embodiment, the phase of the wireless signals simultaneously transmitted from the first antenna element 105 of the antenna subarray 102 and the other antenna element (Antenna3) 206 from the antenna subarray 101 is adjusted by adjusting the phase of the wireless signals within the slave circuits 111, 112 as shown by the phase adjust 225. For an embodiment, the phase of the wireless signals simultaneously transmitted from the first antenna element 105 of the antenna subarray 102 and the other antenna element (Antenna3) 206 from the antenna subarray 101 is adjusted by adjusting the phase of the wireless signals within the master circuit 130 as shown by the phase adjust 228 and within the slave circuits 111, 112 as shown by the phase adjust 225.

For an embodiment, the relative phase offset of signals due to circuitry of the slave circuit 1 111 or the circuitry of the master circuit 130, and due to the time delay of the conductive line 271 between the master circuit 130 and the slave circuit 1 111, and/or due to the time delay of the conductive line 272 between the master circuit 130 and the slave circuit 1 111 is characterized by monitoring the received signal 170 while a controller 180 adjusts the phase offset (225) of the signal transmitted by the first antenna element 105 and adjusts the offset 225 of the third antenna element 206 through, for example, the phase controls 226, 227. For an embodiment, the amplitude of the received signal 170 is highest when the phase delay is adjusted to compensate for the differences in the phase delay between the two conductive traces.

For an embodiment, the relative phase offsets of the connections between the master circuit 130 and each of the slave circuits 111, 112, 113, 114 can be different. If the relative phase offsets of the connections between the master circuit 130 and one of the slave circuits 111, 112, 113, 114 is different than the relative phase offsets of the connections between the master circuit 130 at least one other slave circuits 111, 112, 113, 114, these connections need to each be characterized. For an embodiment, a reference antenna (which may or may not be the same reference antenna as described for FIG. 1) from a first subarray is selected, and the phase offset relative to a selected antenna of another subarray is determined using the described characterization processes. The relative phase offset of each subarray is accordingly determined. That is, the relative phase offset between at least one antenna of each antenna subarray and at least one antenna of each other antenna subarray is characterized.

For an embodiment, the characterized relative phase offset each antenna of the array of antennas is determined based on the characterized relative phase offset determined between antennas of a single (for an embodiments, more than one) subarray (the gold standard) and the characterized relative phase offset determined between an antenna of a subarray and an antenna of each of the other subarrays. That is, by assuming that each of the subarray/slave circuit combination are the same, the relative phase offset between the antennas of each of the individual subarrays is assumed to be the same. Further, based on this assumption, the relative phase offset between only a single antenna of one subarray and a single antenna of each of the other subarrays needs to be characterized or determined. Based on these two characterizations, the relative phase offset between each of the antennas of the entire array of antennas can be determined.

Figure 3:
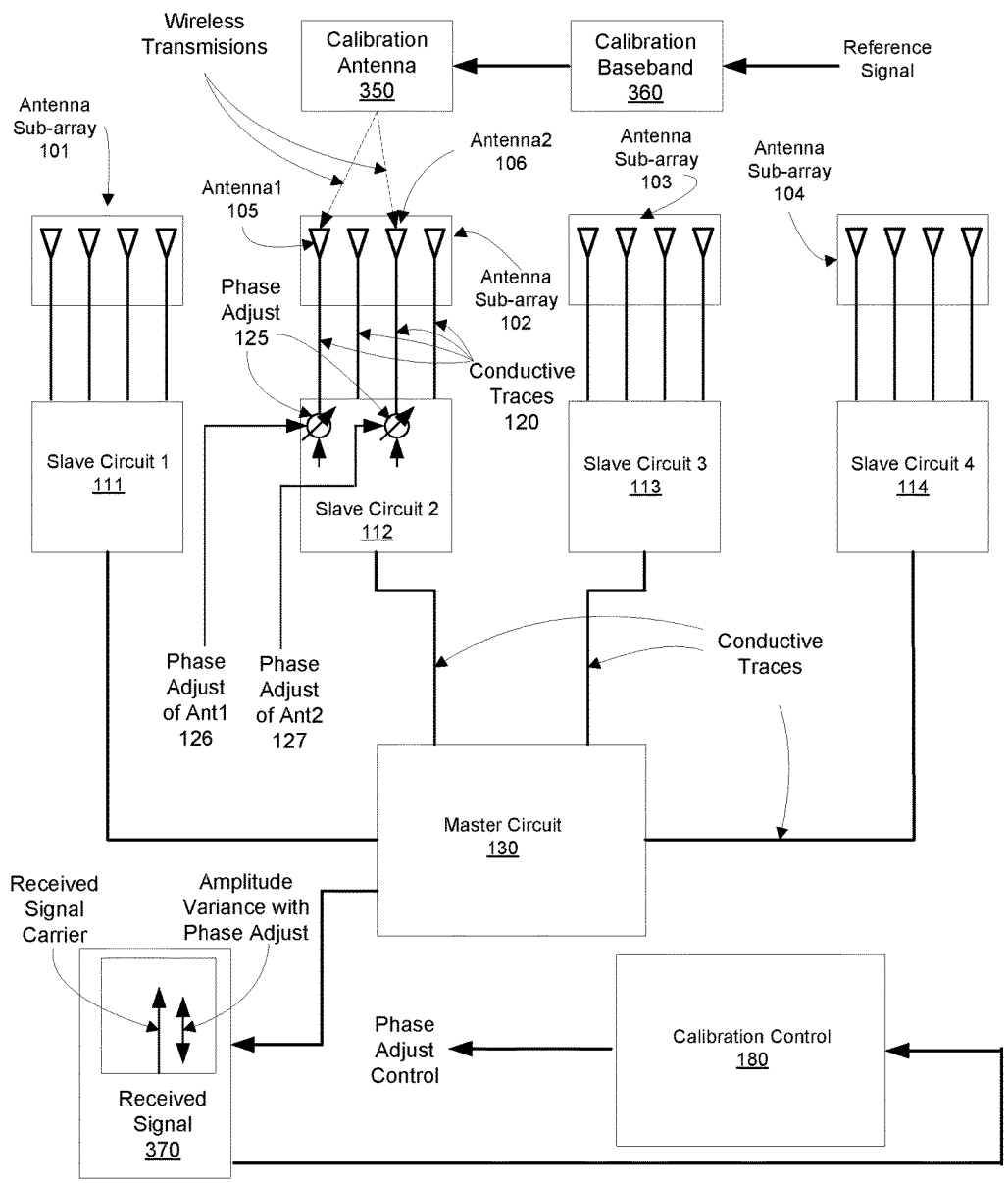
FIG. 3 shows another apparatus for characterizing an array of antenna elements, according to another embodiment.

FIG. 3 shows another apparatus for calibrating an array of antennas elements, according to another embodiment. For this embodiment, a calibration antenna 350 is transmitting a reference signal rather than receiving signals from the antenna elements. Essentially, the process is the reverse of the process of FIG. 1. That is, a reference signal is frequency up-converted through a calibration baseband 360 and transmitted by the calibration antenna 350. The first antenna1 105 and the second antenna2 106 receive the reference signal. A calibration controller 180 adjusts the phase offset (through phase adjust controls 126, 127) of the signals received by the first antenna1 105 and the second antenna2 106. Here, the received signal 370 includes the combined received signals of the first antenna1 105 and the second antenna2 106. The relative phase offset due to the conductive traces 120 and the circuitry of the slave circuit 2 112 can be characterized by adjusting the phase offset 126, 127 while monitoring the received signal 370.

For an embodiment, the characterized relative offsets of FIG. 1 are used for both transmitting and receiving signals by the antenna array. For an embodiment, the characterized relative offsets of FIG. 2 are used for both transmitting and receiving signals by the antenna array. For an embodiment, the characterized relative offsets of FIG. 1 are used for transmitting signals by the antenna array, and the characterized relative offsets of FIG. 2 are used for receiving signals by the antenna array.

Figure 4:
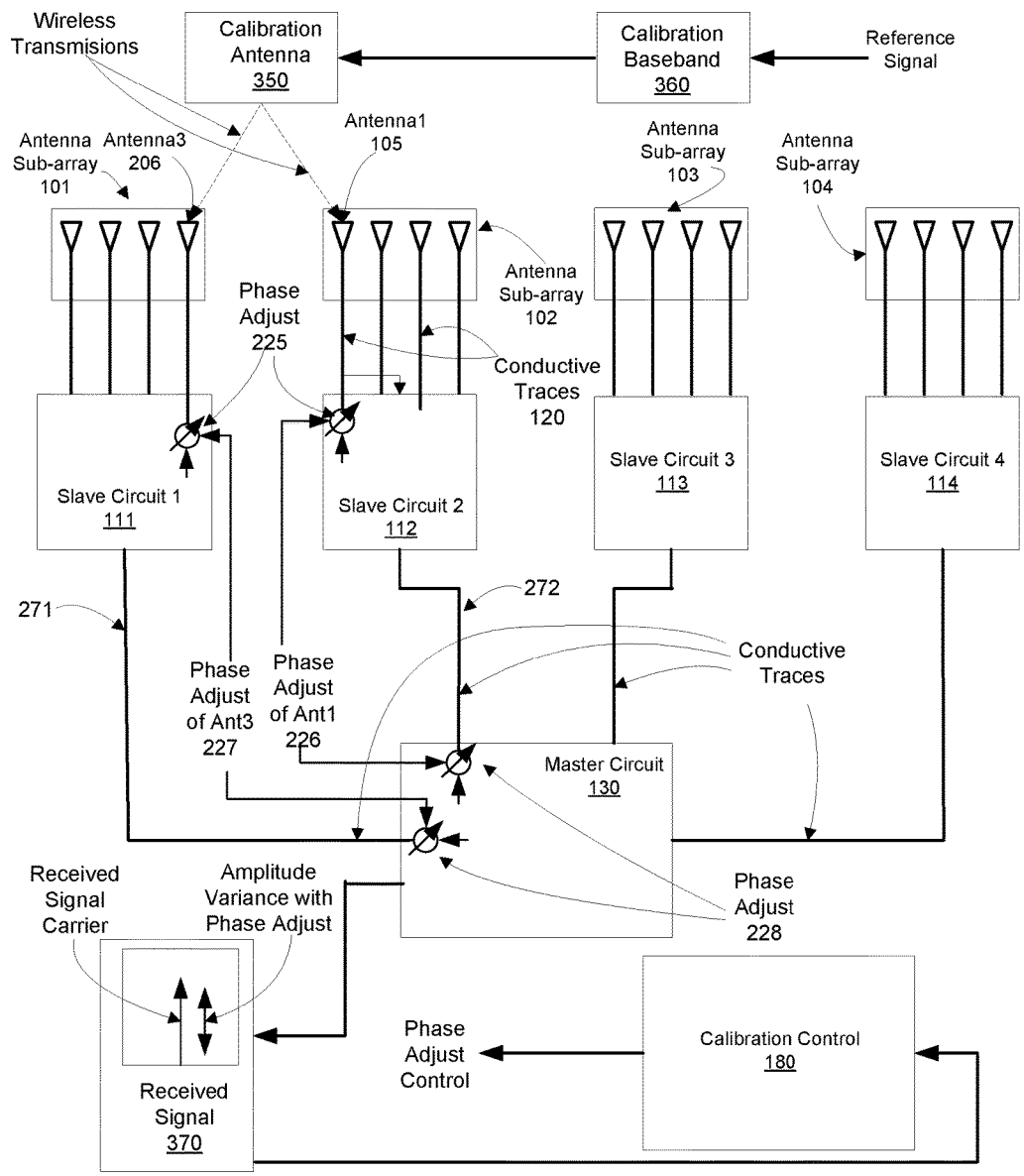
FIG. 4 shows another apparatus for characterizing an array of antenna elements, according to another embodiment.

FIG. 4 shows another apparatus for calibrating an array of antennas, according to another embodiment. For this embodiment, the calibration antenna 350 is transmitting a reference signal rather than receiving signals from the antenna elements. Essentially, the process is the reverse of the process of FIG. 2. That is, a reference signal is frequency up-converted through a calibration baseband 360 and transmitted by the calibration antenna 350. The first antenna1 105 and the third antenna3 206 receive the reference signal. A calibration controller 180 adjusts the phase offset (through, for example, the phase adjust controls 226, 227) of the signals received by the first antenna1 105 and the third antenna3 206. Here, the received signal 370 includes the combined received signals of the first antenna1 105 and the third antenna2 206. The relative phase offset due to the conductive traces 271, 272 and the circuitry of the master circuit 130 can be characterized by adjusting the phase offset 226, 227 while monitoring the received signal 370.

For an embodiment, the characterized relative offsets of FIG. 3 are used for both transmitting and receiving signals by the antenna array. For an embodiment, the characterized relative offsets of FIG. 4 are used for both transmitting and receiving signals by the antenna array. For an embodiment, the characterized relative offsets of FIG. 3 are used for transmitting signals by the antenna array, and the characterized relative offsets of FIG. 4 are used for receiving signals by the antenna array.

FIG. 5 is a flow chart that includes acts of a method of calibrating an array of antennas, according to an embodiment. A first step 510 includes selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit. A second step 520 includes receiving by the first slave circuit a signal from a master circuit through a first port of the master circuit. A third step 530 includes receiving by the second slave circuit the signal from the master circuit through a second port of the master circuit. A fourth step 540 includes transmitting the signal through the at least one antenna element of the first subarray having a first selected phase. A fifth step 550 includes transmitting the signal through the at least one antenna element of the second subarray having a second selected phase. A sixth step 560 includes characterizing a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

An embodiment includes adjusting the first selected phase or the second selected phase at the first slave circuit or the second slave circuit. An embodiment includes adjusting the first selected phase or the second selected phase at master circuit. An embodiment includes adjusting the first selected phase or the second selected phase at the first slave circuit, at the second slave circuit, or at the master circuit. For an embodiment, the first selected phase or the second selected phase is adjusted at the master circuit when characterizing the relative phase offset between antenna elements of different antenna subarrays, and the first selected phase or the second selected phase is adjusted at the slave circuits when characterizing the relative phase offset between antenna elements of the same antenna subarray.

An embodiment includes characterizing a relative phase offset between a first antenna element of a subarray of the plurality of antenna subarrays and a second antenna element of the subarray. That is, as previously described the relative phase offset between antenna elements of a same or common subarray of the plurality of subarrays is characterized. For an embodiment, such relative phase offset characterization includes characterizing a relative phase offset between a reference antenna element of an antenna subarray of the plurality of subarrays and each other antenna element of the antenna subarray. For an embodiment, the relative phase offset characterization includes selecting a reference antenna element of the antenna subarray, successively selecting another antenna element of the antenna subarray, characterizing a relative phase offset between the reference antenna element and each selected other antenna element of the antenna subarray, comprising adjusting a phase delay of the signal transmitted by the reference antenna element or adjusting a phase delay of the signal transmitted from each successively selected other antenna element, and monitoring a signal received at the calibration antenna while the adjusting the phase delay of the signal of the reference antenna element or adjusting the phase delay of the signal of each successively selected other antenna element.

For an embodiment, characterizing the relative phase offset between antenna elements of different subarrays includes characterizing a relative phase offset between the at least one antenna element of the first antenna subarray and the at least one antenna element of each of the other antenna subarrays, including successively selecting the at least one antenna element of each of the other antenna subarrays, selecting a phase of a signal transmitted from the reference antenna element, selecting a phase of the signal transmitted from the at least one antenna element of each of the other antenna subarrays, adjusting the phase of the signal transmitted from the reference antenna element or the phase of the signal transmitted from the at least one antenna element of each of the other antenna subarrays, and monitoring a signal received at the calibration antenna that receives the signal transmitted from the reference antenna element and the signal transmitted from the at least one antenna element of each of the other antenna subarrays while the phase of a signal transmitted from the reference antenna element or the phase of a signal transmitted from the at least one antenna element of each of the other antenna subarrays is adjustably selected.

Once the relative phase offset between antenna elements of different antenna subarrays has been determined, and the relative phase offset between antenna elements of a common antenna subarray has been determined, other relative phase offset between other antenna elements of different antenna subarrays can be determined. For an embodiment, characterizing the relative phase offset between a first antenna element of the first antenna subarray and a second antenna element of the second antenna subarray is based on the characterization of the relative phase offset between the at least one antenna element of the first antenna subarray and the at least one antenna element of the second antenna subarray, and the characterization of the relative phase offset between the first antenna element of the subarray of the plurality of antenna subarrays and the second antenna element of the subarray.

An embodiment includes storing the characterized relative phase offset between the at least one antenna element of the first antenna subarray and the at least one antenna element of a second antenna subarray, and retrieving the characterized relative stored phase offset for transmission of communication signals from an antenna element of the first antenna subarray or transmission of communication signals from an antenna element of the second antenna subarray. That is, the relative phase offset characterization are stored, and then retrieved to aid in the formation of beamforming signals during transmission of signals or during reception of signals.

For at least some embodiments, the relative phase offset is influenced by a time delay caused by conductive lines between the master circuit and the slave circuit of the first subarray and between the master circuit and the slave circuit of the second subarray, and the relative phase offset is influenced by a phase shift to the signal caused by circuitry of at least one of the master circuit, the slave circuit of the first subarray or the slave circuit of the second subarray.

For at least some embodiments, the subarrays are selected from the plurality of subarrays to enable operation of the calibration antenna within a predetermined distance of at least one of the subarrays. The reception of wireless signals by the calibration antenna from different antenna elements within an antenna array influenced by the distance the calibration antenna is from the different antenna elements. More specifically, the distance the calibration antenna is located from the antenna elements, is constrained by a distance between the antenna elements. As dictated by far-field considerations, the reference antenna must be located at least a certain distance from the antenna elements, wherein the certain distance is dependent on the distance between the antenna elements, and a carrier frequency of signals communicated between the antenna elements and the calibration antenna. Therefore, the larger the array of antennas, the farther away the calibration antenna must be located in order to characterize the relative phase offset between the antenna elements of the array of antenna that are physically spaced apart the farthest.

For at least some embodiments, the size of the selected subarrays of the array of antenna elements is selected to allow the calibration antenna to be located within a desired distance of the subarrays. That is, the smaller the selected subarray, the closer the calibration antenna can be to the subarrays when characterizing the relative phase offset between the antenna elements of the subarrays. Further, once the "gold standard" has been established for a subarray, the characterization of the relative phase offset between the other subarrays can be performed between antenna elements of the subarray and the other subarrays that are located the closest to each other.

At least some embodiments further include performing a plurality of characterizations of the relative phase offset between a master circuit and a slave circuit of the first subarray and a slave circuit of the second subarray, and averaging the plurality of characterizations. The averaging of the plurality of characterizations can include one of more of several different combinations of characterizations. Further, the combination of the plurality of characterization can be according to other statistical means other than averaging. For example, for an embodiment, the relative phase offsets between the different antenna elements of a first subarray are characterized multiple times and then the characterizations are statistically combined. For an embodiment, relative phase offsets between the different antenna elements of multiple different subarrays are characterized and then the characterizations are statistically combined. For an embodiment, the relative phase offsets between the different antenna elements of multiple different subarrays are characterized multiple times and then the characterizations are statistically combined.

For an embodiment, characterizing a relative phase offset between the at least one antenna element of the first antenna subarray and the at least one antenna element of the second antenna subarray further comprises compensating for a difference between a distance between the reference antenna element and the at least one antenna element of the first antenna subarray and a distance between the at least one antenna element of the second antenna subarray.

For an embodiment, the relative phase offsets between the different antenna elements of one or more subarrays are characterized at a time before deployment of the antenna array. The characterized relative phase offsets between the different antenna elements are then used during use of the antenna array be retrieving the stored characterized relative phase offsets.

For at least some embodiments, the relative phase offsets between the different antenna elements of one or more subarrays are characterized over time, wherein the characterization occur after deployment of the antenna array. The characterization of time can occur periodically, or can be triggered based on sensing or determining that new characterizations of the relative phase offsets between the different antenna elements is needed or required.

For at least some embodiments, the phase offset adjustments of each of the antenna elements includes a finite number of phase adjust selections. For example, the phase adjustments may only include N settings. Therefore, the selected phase adjustment setting is selected based on the store values of the characterizations of the relative phase offsets between the different antenna elements and the available phase offset settings for each of the antenna elements.

FIG. 6 is a flow chart that includes acts of a method of calibrating an array of antennas, according to an embodiment. A first step 610 includes selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit. A second step 620 includes receiving a signal through the at least one antenna element of the first antenna subarray from a calibration antenna. A third step 630 includes communicating, by the first slave circuit, the received signal to a master circuit through a first port of the master circuit. A fourth step 640 includes phase adjusting the received signal with a first selected phase. A fifth step 650 includes receiving the signal through the at least one antenna element of the second subarray from the calibration antenna. A sixth step 660 includes communicating, by the second slave circuit, the received signal to the master circuit through a second port of the master circuit. A seventh step 670 includes phase adjusting the received signal with a second selected phase. An eight step 680 includes characterizing a relative phase offset between the at least one antenna element of the first antenna subarray and the at least one antenna element of the second antenna subarray, comprising adjusting at least one of the first selected phase and the second selected phase, and monitoring the signal received by the at least one antenna element of the first subarray and the signal received by the at least one antenna element of second subarray.

An embodiment includes adjusting the first selected phase or the second selected phase at the first slave circuit or the second slave circuit. An embodiment includes adjusting the first selected phase or the second selected phase at master circuit. An embodiment includes adjusting the first selected phase or the second selected phase at the first slave circuit, at the second slave circuit, or at the master circuit. For an embodiment, the first selected phase or the second selected phase is adjusted at the master circuit when characterizing the relative phase offset between antenna elements of different antenna subarrays, and the first selected phase or the second selected phase is adjusted at the master circuit when characterizing the relative phase offset between antenna elements of the same antenna subarray.

For an embodiment, characterizing a relative phase offset between a reference antenna element of an antenna subarray of the plurality of antenna subarrays and each other antenna element of the antenna subarray includes selecting a reference antenna element of the antenna subarray, successively selecting another antenna element of the antenna subarray, characterizing a relative phase offset between the reference antenna element and each selected other antenna element of the antenna subarray, comprising adjusting a phase delay of the signal received by the reference antenna element or adjusting a phase delay of the signal received from each successively selected other antenna element, and monitoring a signal received at the reference antenna element and each selected other antenna of the antenna subarray while the adjusting the phase delay of the signal received by reference antenna element or adjusting the phase delay of the signal received by each successively selected other antenna element.

For an embodiment, characterizing a relative phase offset between the at least one antenna element of the first antenna subarray and the at least one antenna element of each of the other antenna subarrays includes successively selecting the at least one antenna element of each of the other antenna subarrays, receiving a signal through the at least one antenna element of the first subarray from a calibration antenna, communicating, by the first slave circuit, the received signal to a master circuit through a first port of the master circuit, phase adjusting the received signal communicated to the first port with a first selected phase, receiving the signal through the at least one antenna element each of the successively selected other antenna subarrays from the calibration antenna, communicating, by a slave circuit associated with each of the successively selected other antenna subarrays, the received signal to the master circuit through each corresponding port of the master circuit, phase adjusting the received signal communicated to each corresponding port the with a corresponding selected phase, characterizing a relative phase offset between the received signal of the at least one antenna element of the first antenna subarray and the receive signal of the at least one antenna element each of the successively selected other antenna subarrays, comprising adjusting at least one of the first selected phase and each corresponding phase, and monitoring the signal received by the at least one antenna element of the first subarray and the signal received by the at least one antenna element each of the successively selected other antenna subarrays.

Once the relative phase offset between antenna elements of different antenna subarrays has been determined, and the relative phase offset between antenna elements of a common antenna subarray has been determined, other relative phase offset between other antenna elements of different antenna subarrays can be determined. For an embodiment, characterizing the relative phase offset between a first antenna element of the first antenna subarray and a second antenna element of the second antenna subarray is based on the characterization of the relative phase offset between the at least one antenna element of the first antenna subarray and the at least one antenna element of the second antenna subarray, and the characterization of the relative phase offset between the first antenna element of the subarray of the plurality of antenna subarrays and the second antenna element of the subarray.

An embodiment includes storing the characterized relative phase offset between the at least one antenna element of the first antenna subarray and the at least one antenna element of a second antenna subarray, and retrieving the characterized relative stored phase offset for transmission of communication signals from an antenna element of the first antenna subarray or transmission of communication signals from an antenna element of the second antenna subarray. That is, the relative phase offset characterization are stored, and then retrieved to aid in the formation of beamforming signals during transmission of signals or during reception of signals.

For at least some embodiments, the relative phase offset is influenced by a time delay caused by conductive lines between the master circuit and the slave circuit of the first subarray and between the master circuit and the slave circuit of the second subarray, and the relative phase offset is influenced by a phase shift to the signal caused by circuitry of at least one of the master circuit, the slave circuit of the first subarray or the slave circuit of the second subarray.

For at least some embodiments, the subarrays are selected from the plurality of subarrays to enable operation of the calibration antenna within a predetermined distance of at least one of the subarrays. The reception of wireless signals by the calibration antenna from different antenna elements within an antenna array influenced by the distance the calibration antenna is from the different antenna elements. More specifically, the distance the calibration antenna is located from the antenna elements, is constrained by a distance between the antenna elements. As dictated by far-field considerations, the reference antenna must be located at least a certain distance from the antenna elements, wherein the certain distance is dependent on the distance between the antenna elements, and a carrier frequency of signals communicated between the antenna elements and the calibration antenna. Therefore, the larger the array of antennas, the farther away the calibration antenna must be located in order to characterize the relative phase offset between the antenna elements of the array of antenna that are physically spaced apart the farthest.

For at least some embodiments, the size of the selected subarrays of the array of antenna elements is selected to allow the calibration antenna to be located within a desired distance of the subarrays. That is, the smaller the selected subarray, the closer the calibration antenna can be to the subarrays when characterizing the relative phase offset between the antenna elements of the subarrays. Further, once the "gold standard" has been established for a subarray, the characterization of the relative phase offset between the other subarrays can be performed between antenna elements of the subarray and the other subarrays that are located the closest to each other.

At least some embodiments further include performing a plurality of characterizations of the relative phase offset between a master circuit and a slave circuit of the first subarray and a slave circuit of the second subarray, and averaging the plurality of characterizations. The averaging of the plurality of characterizations can include one of more of several different combinations of characterizations. Further, the combination of the plurality of characterization can be according to other statistical means other than averaging. For example, for an embodiment, the relative phase offsets between the different antenna elements of a first subarray are characterized multiple times and then the characterizations are statistically combined. For an embodiment, relative phase offsets between the different antenna elements of multiple different subarrays are characterized and then the characterizations are statistically combined. For an embodiment, the relative phase offsets between the different antenna elements of multiple different subarrays are characterized multiple times and then the characterizations are statistically combined.

For an embodiment, characterizing a relative phase offset between the at least one antenna element of the first antenna subarray and the at least one antenna element of the second antenna subarray further comprises compensating for a difference between a distance between the reference antenna element and the at least one antenna element of the first antenna subarray and a distance between the at least one antenna element of the second antenna subarray.

For an embodiment, the relative phase offsets between the different antenna elements of one or more subarrays are characterized at a time before deployment of the antenna array. The characterized relative phase offsets between the different antenna elements are then used during use of the antenna array be retrieving the stored characterized relative phase offsets.

For at least some embodiments, the relative phase offsets between the different antenna elements of one or more subarrays are characterized over time, wherein the characterization occur after deployment of the antenna array. The characterization of time can occur periodically, or can be triggered based on sensing or determining that new characterizations of the relative phase offsets between the different antenna elements is needed or required.

For at least some embodiments, the phase offset adjustments of each of the antenna elements includes a finite number of phase adjust selections. For example, the phase adjustments may only include N settings. Therefore, the selected phase adjustment setting is selected based on the store values of the characterizations of the relative phase offsets between the different antenna elements and the available phase offset settings for each of the antenna elements.

Figure 7:
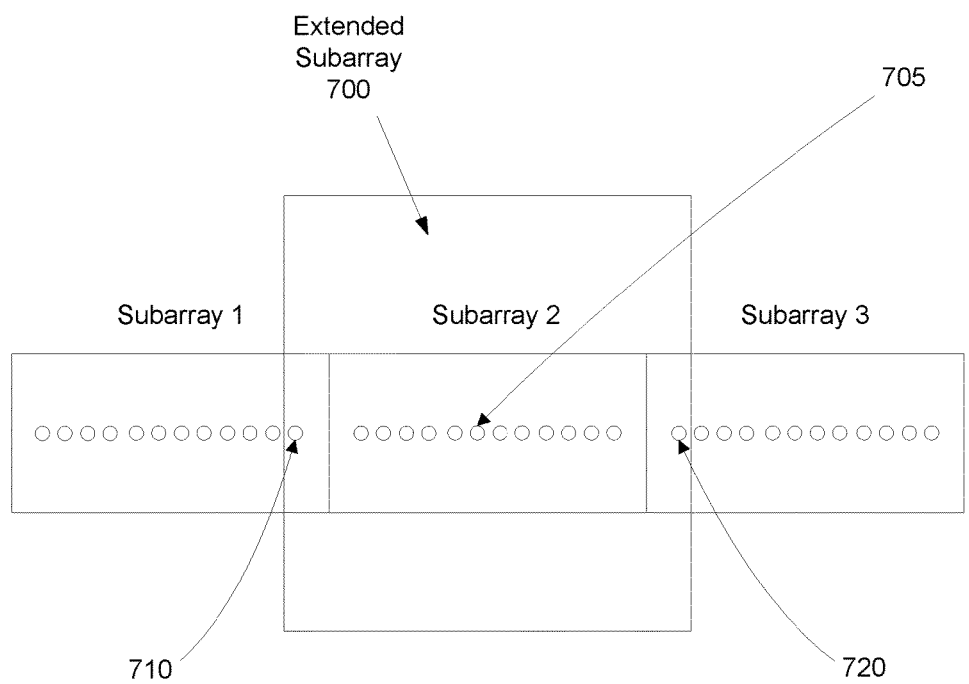
FIG. 7 shows subarrays and an extended subarray, according to an embodiment.

FIG. 7 shows subarrays and an extended subarray 700, according to an embodiment. For this embodiment, each of the subarrays includes 12 antenna elements. An extended array can be defined that includes at least one antenna element of each of the subarrays. For example, the extended subarray 700 of FIG. 7 includes all of the antenna elements of the subarray 2, and one antenna element of the subarray 1 and one antenna element of the subarray 3.

The characterization processes of FIG. 1 or of FIG. 3 can be used to characterize the subarray 2 including the circuitry of the slave circuit of the subarray 2 and the conductive lines between the slave circuit of the subarray 2 and the antenna elements of subarray 2. That is, as described, an embodiment includes selecting a reference antenna within the subarray 2, and characterizing the relative phase offset between the reference antenna and each of the other antenna elements of the subarray 2. For an embodiment, the characterization of the subarray 2 is used as a gold standard, and the other antenna subarrays (subarray 1 and subarray 3) are assume to be the same.

For an embodiment, the characterization of the subarray 2 is used to approximate characterization of subarray 1 and subarray 3. That is, the characterization of the subarray 2 is used as the previously described "gold standard" which is the applied to the other subarrays because the other subarrays are assumed to be nearly the same as the gold standard.

The characterization processes of FIG. 2 or of FIG. 4 can be used to characterize the circuitry of the master circuit of the subarrays, and the conductive lines between the master circuit and the slave circuits of the array 1, array 2 and array 3. That is, the relative phase offset between the different subarrays is determined by characterizing the relative phase offset between a selected antenna (such as, reference antenna 705) of the second subarray and a selected antenna (such as, antenna elements 710 or 720) of one other subarray.

Further, the relative phase offset between the master circuit and the antenna elements of the subarray 1, subarray 2 and subarray 3 can be estimated base on the characterizations of the subarrays, and the characterizations of the circuitry of the master circuit of the subarrays, and the conductive lines between the master circuit and the slave circuits of the array 1, array 2 and array 3.

Figure 8:
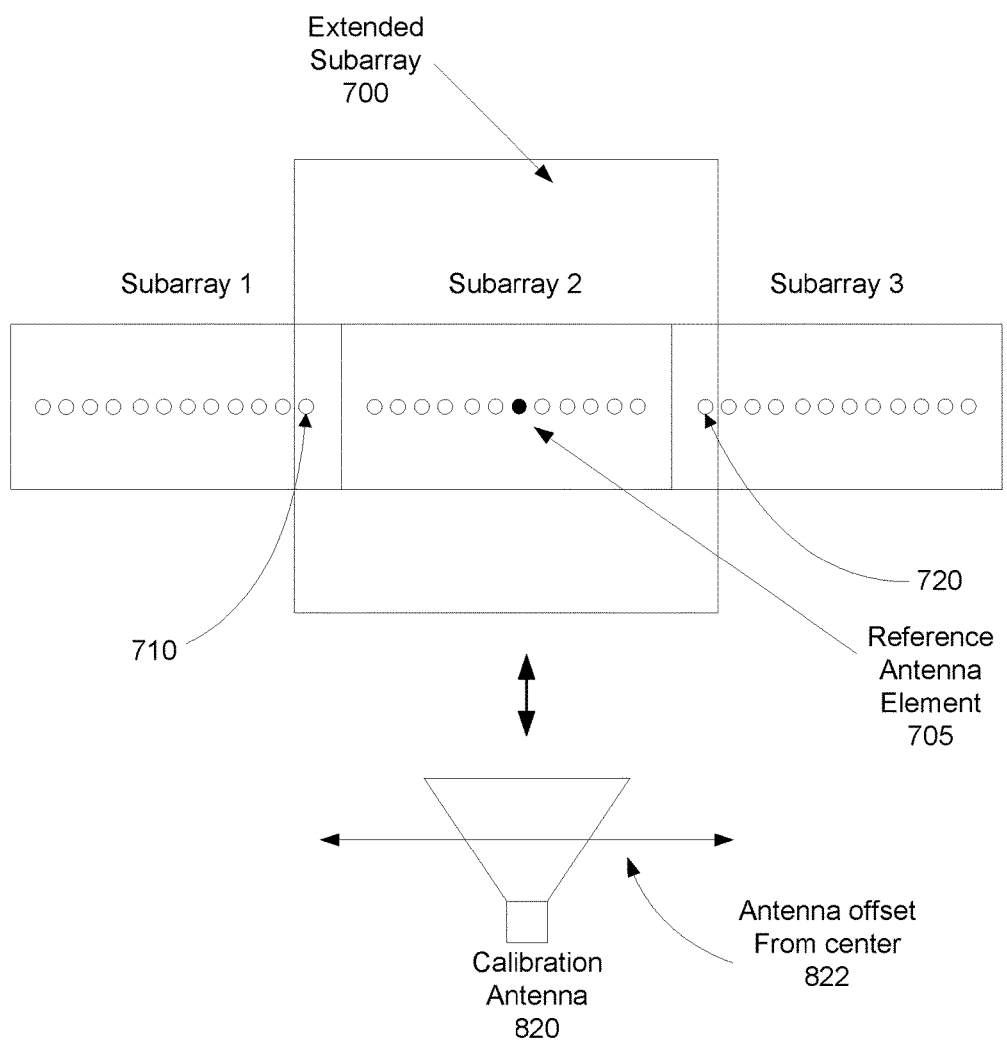
FIG. 8 shows the subarrays and the extended subarray of FIG. 7, and a calibration antenna, according to an embodiment.

FIG. 8 shows the subarrays and the extended subarray 700 of FIG. 7, and a calibration antenna 820, according to an embodiment. As previously described, the calibration antenna 820 receives (FIGS. 1, 2) or transmits (FIGS. 3, 4) wireless signals from or to the reference antenna element 705 and at least one of the selected antennas 710, 720. The relative phase offset between antenna elements of each subarray is characterized, and the relative phase offset between antenna elements of different subarrays is characterized. As previously described, the distance between the calibration antenna 820 and the subarrays is at least partially determined by the size (number of antenna elements) of the selected antenna subarrays.

Ideally, the calibration antenna 820 is located directly over (straight out, perpendicular to) the antenna elements of the subarray(s) that is relative phase offset is being characterized between. However, it is physically impossible to simultaneously locate the calibration antenna directly over multiple antenna elements. However, by knowing the offset distance (that is, the distance the calibration antenna is from being located directly over (perpendicular to) an antenna being characterized) the differences between the distance from the calibration antenna can be compensated for. As shown by arrow 822, the calibration antenna maybe offset from the center of, for example, placement of directly over the reference antenna 705. By knowing the offset and the distance between the calibration antenna and the subarrays, processing can compensate for the offset.

Figure 9:
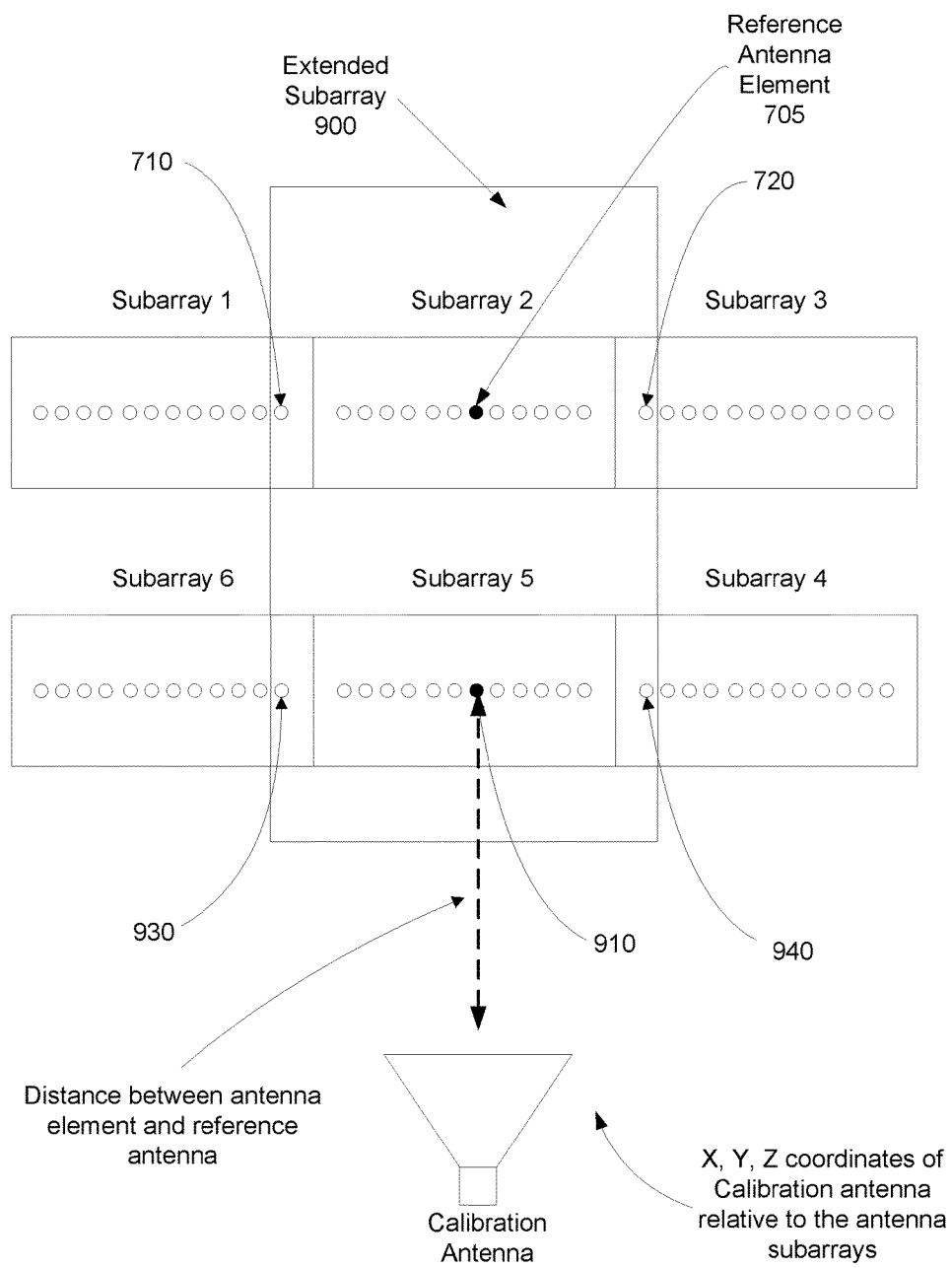
FIG. 9 shows subarrays, and extended subarray, and a calibration antenna, according to an embodiment.

FIG. 9 shows subarrays, and extended subarray 900, and a calibration antenna, according to an embodiment. This embodiment additionally includes subarray 4, subarray 5 and subarray 6. As previously described, the size of each of the antenna subarrays can be selected in order to allow the calibration antenna to be located within a desired distance of the antenna array or at least one of the antenna subarrays. For this embodiment, a reference antenna element 705 of the second subarray is selected, and a reference antenna element 910 of the subarray 5 is selected. Using the previously described methods, the relative phase offset is characterized between the reference antenna element 705 of the second subarray and the reference antenna element 910 of the subarray 5. Further, the relative phase offset is characterized between the reference antenna element 910 of the subarray 5, and antenna elements 930, 940 of the subarray 6 and subarray 4. For this embodiment, the extended subarray 900 includes the antenna elements of the subarray 2 and the subarray 5, and antenna elements 710, 720, 930, 940 of the subarray 1, subarray 3, subarray 4, subarray 6. Clearly, other combination of antenna elements can be included within the extended subarray. However, for an embodiment, the location of the calibration antenna is dependent on the selection of the antenna elements within the extended subarray.

At least some embodiments include compensating for the displacement of the calibration antenna 920 relative to the antenna elements being characterized. Ideally the calibration antenna 920 and the antenna array being characterized point at each other (broadside) in general. However any inherent rotation and or displacement can be compensated by knowing the geometry (x y z) coordinates of the setup. At least some embodiments compensate for the location of the calibration antenna 920 relative to the antenna elements being characterized. For example, for an embodiment, the displacement of the calibration antenna 920 from directly over each antenna element is compensated by knowing the X, Y, and Z coordinates 922 of the calibration antenna 920 relative to the antenna elements 705, 710, 720, 910, 930, 940.

Figure 10:
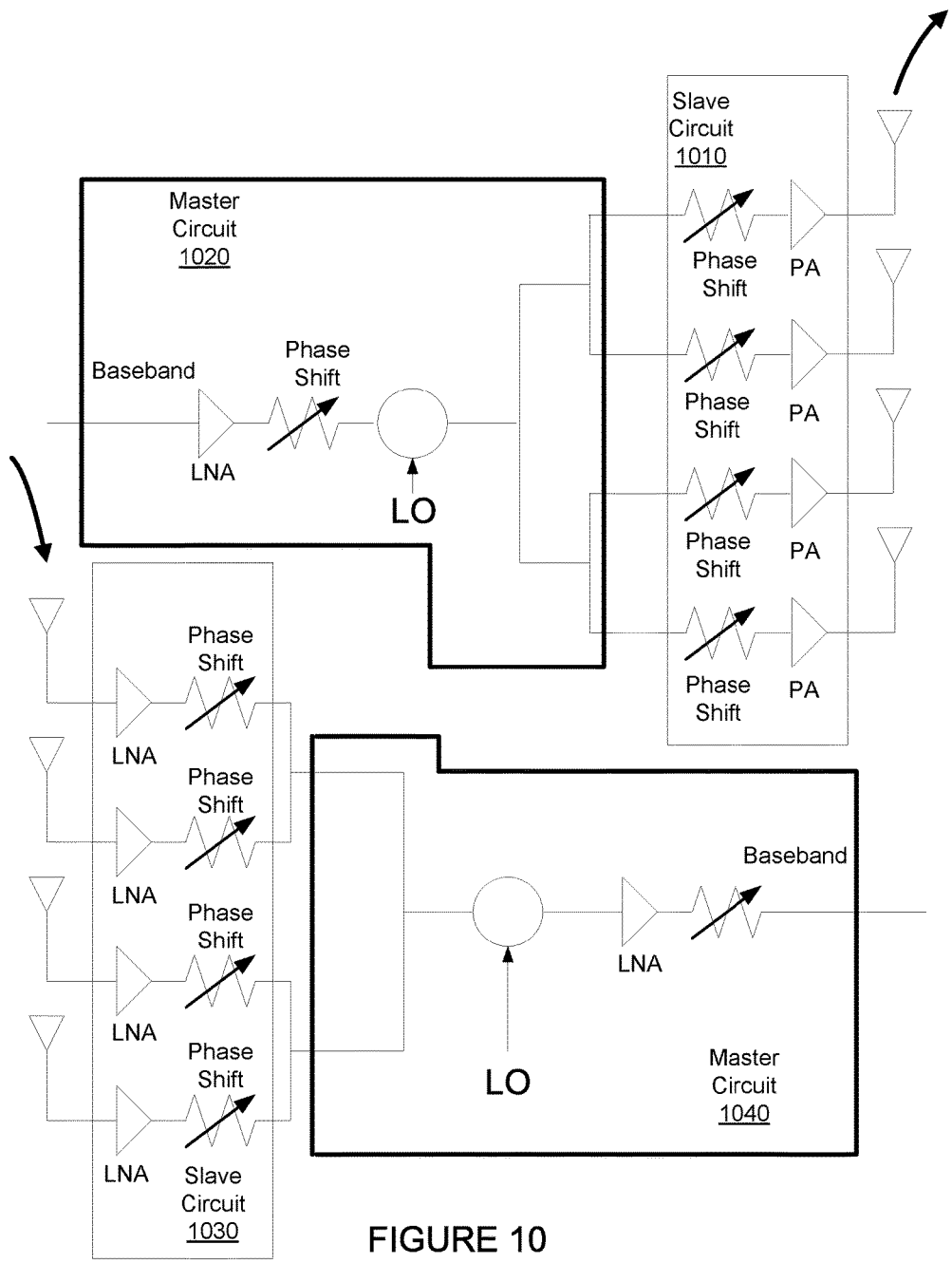
FIG. 10 shows master circuits and slave circuits, according to at least some embodiments.

FIG. 10 shows master circuits and slave circuits, according to at least some embodiments. For an embodiment, a master circuit 1020 receives a baseband signal for transmission from the antenna elements. For an embodiment, the master circuit 1020 includes an LNA (low noise amplifier), a phase shifter, and a frequency up-converter. Further, for an embodiment, a slave circuit 1010 includes phase shifters and an PA (power amplifier) for each antenna element. While the LO (local oscillator) of the frequency up-converter of FIG. 10 is shown within the master circuit 1020, for other embodiments, the LO is located within the slave circuit 1010. This embodiment is consistent with the calibration antenna receiving wireless signals from the antenna elements as shown in FIGS. 1 and 3.

For an embodiment, a master circuit 1040 includes an LNA (low noise amplifier), a phase shifter, and a frequency down-converter. Further, for an embodiment, a slave circuit 1030 includes phase shifters and an LNA for each antenna element. While the LO of FIG. 10 is shown within the master circuit 1040, for other embodiments, the LO is located within the slave circuit 1030. This embodiment is consistent with the calibration antenna transmitting wireless signals to antenna elements as shown in FIGS. 2 and 4. For this embodiment, the master circuit generates the baseband signal.

Pre-Coding

For at least some embodiments, a pre-coder processes or post-processes signals for generating the beamforming of the wireless communication of the signals. Generally, the beamforming is controlled by coefficients of the pre-coder. For an embodiment, these coefficients account for the stored characterized relative phase offsets of the antenna elements of the antenna array.

For an embodiment, a geometric beamforming vector follows a DFT (discrete Fourier transform) like structure as shown below:

$$v_N(\theta) = \begin{bmatrix} 1 \\ \exp(j\theta) \\ \vdots \\ \exp(jk\theta) \\ \vdots \\ \exp(j(N-1)\theta) \end{bmatrix}$$

In the above the beam is pointed at directional cosine (angular frequency) $\theta$. The relationship between the angular frequency $\theta$ and the physical angle of arrival/departure $\psi$ is $$\theta = \frac{2\pi d \cos(\psi)}{\lambda}$$

wherein d is the distance between the elements in the array, $\lambda$ is the wavelength corresponding to the center frequency of the channel or the carrier signal. Here, an angle of arrival/departure is computed with reference to an array axis. For example, the broadside is 90 degrees. It can be observed that a codebook for the coefficients is antenna and channel frequency dependent.

An embodiment includes an antenna board that includes two arrays with the that each include 3 subarrays. With this structure, the pre-coder structure can be as follows:

$$v_{2N}(\theta) = \begin{bmatrix} v_N(\theta) \\ cv_N(\theta) \end{bmatrix}$$

where c is the phase correction to enable coherent combining of the two arrays.

Due to unequal trace length in the arrays and subarrays, which is compensated by phase compensation (that is, based on the characterized relative phase offsets), the effective pre-coder doesn't follow the DFT structure. Also, due to internal circuitry difference, there might be an inherent phase difference. For an embodiment, the calibration process compensates the above issues. The assumption here is that the non-idealities are independent of the scan angle. Therefore the calibrated values at broadside can be applied on top of the ideal codebook to get the calibrated codebook. Letting $\varepsilon_i$ be the calibrated phase value. Then the effective pre-coder is given as:

$$v_N(\theta) = \begin{bmatrix} 1 \\ \exp(j(\theta + \varepsilon_1)) \\ \vdots \\ \exp(j\theta + \varepsilon_n) \\ \vdots \\ \exp(j((N-1)\theta + \varepsilon_{N-1})) \end{bmatrix}$$

$\varepsilon_0 = 0$ for reference.

The described pre-coder is an un-quantized version. An embodiment supports 6 bits per phase variable in the antenna array. Letting γ be the un-quantized phase measured in degrees. The mapping to one of 64 indices is as follows.

$$\text{index}(\gamma) = \text{round}\left(\frac{64\gamma}{360}\right)$$

It is to be noted that the quantization performed by the pre-coder is in the directional cosine domain.

Golden Calibration

For an embodiment, the previously described gold standard for each subarray is used to represent the characterized phase offset between the antenna elements of each subarray.

Although specific embodiments have been described and illustrated, the embodiments are not to be limited to the specific forms or arrangements of parts so described and illustrated. The described embodiments are to only be limited by the claims.

What is claimed:

1. A method, comprising:
selecting at least one antenna element of a first antenna subarray of a plurality of the antenna subarrays and at least one antenna element of a second antenna subarray of the plurality of the antenna subarrays, wherein the first antenna subarray comprises a plurality of antenna elements, and the second antenna subarray comprises a plurality of antenna elements, and wherein the first antenna subarray is electrically connected to a first slave circuit, and wherein the first slave circuit electrically connects a single port of the first slave circuit to each of the plurality of antenna elements of the first antenna subarray, wherein a signal delay of a signal propagating from the single port of the first slave circuit to the at least one antenna element of the first antenna subarray is different than a signal delay of a signal propagating from the single port of the first slave circuit to another antenna element of the first antenna subarray, and the second antenna subarray is electrically connected to a second slave circuit, wherein the second slave circuit electrically connects a single port of the second slave circuit to each of the plurality of antenna elements of the second antenna subarray, wherein a signal delay of a signal propagating from the single port of the second slave circuit to the at least one antenna element of the second antenna subarray is different than a signal delay of a signal propagating from the single port of the second slave circuit to another antenna element of the second antenna subarray;
receiving by the single port of the first slave circuit a signal from a master circuit through a first port of the master circuit;
receiving by the single port of the second slave circuit the signal from the master circuit through a second port of the master circuit;
transmitting the signal through the at least one antenna element of the first subarray having a first selected phase;
transmitting the signal through the at least one antenna element of the second subarray having a second selected phase; and
characterizing a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

2. The method of claim 1, further comprising adjusting the first selected phase or the second selected phase at the first slave circuit or the second slave circuit.

3. The method of claim 1, further comprising adjusting the first selected phase or the second selected phase at master circuit.

4. The method of claim 1, further comprising:
characterizing a relative phase offset between a first antenna element of a subarray of the plurality of antenna subarrays and a second antenna element of the subarray.

5. The method of claim 4, further comprising:
characterizing the relative phase offset between a first antenna element of the first antenna subarray and a second antenna element of the second antenna subarray based on:
the characterization of the relative phase offset between the at least one antenna element of the first antenna subarray and the at least one antenna element of the second antenna subarray; and
the characterization of the relative phase offset between the first antenna element of the subarray of the plurality of antenna subarrays and the second antenna element of the subarray.

6. The method of claim 1, further comprising characterizing a relative phase offset between a reference antenna element of an antenna subarray of the plurality of subarrays and each other antenna element of the antenna subarray comprising:
selecting a reference antenna element of the antenna subarray;
successively selecting another antenna element of the antenna subarray;
characterizing a relative phase offset between the reference antenna element and each selected other antenna element of the antenna subarray, comprising adjusting a phase delay of the signal transmitted by the reference antenna element or adjusting a phase delay of the signal transmitted from each successively selected other antenna element, and monitoring a signal received at the calibration antenna while the adjusting the phase delay of the signal of the reference antenna element or adjusting the phase delay of the signal of each successively selected other antenna element.

7. The method of claim 1, further comprising characterizing a relative phase offset between the at least one antenna element of the first antenna subarray and the at least one antenna element of each of the other antenna subarrays; comprising:
successively selecting the at least one antenna element of each of the other antenna subarrays;
selecting a phase of a signal transmitted from the reference antenna element;
selecting a phase of the signal transmitted from the at least one antenna element of each of the other antenna subarrays;
adjusting the phase of the signal transmitted from the reference antenna element or the phase of the signal transmitted from the at least one antenna element of each of the other antenna subarrays;
and monitoring a signal received at the calibration antenna that receives the signal transmitted from the reference antenna element and the signal transmitted from the at least one antenna element of each of the other antenna subarrays while the phase of a signal transmitted from the reference antenna element or the phase of a signal transmitted from the at least one antenna element of each of the other antenna subarrays is adjustably selected.

8. The method of claim 1, further comprising:
storing the characterized relative phase offset between the at least one antenna element of the first antenna subarray and the at least one antenna element of a second antenna subarray; and
retrieving the characterized relative stored phase offset for transmission of communication signals from an antenna element of the first antenna subarray or transmission of communication signals from an antenna element of the second antenna subarray.

9. The method of claim 1, wherein antenna subarrays are selected from the plurality of antenna subarrays to enable operation of the calibration antenna within a predetermined distance of at least one of the antenna subarrays.

10. The method of claim 1, further comprising performing a plurality of characterizations of relative phase offset between the at least one antenna element of the first antenna subarray and the at least one antenna element of the second antenna subarray, and averaging the plurality of characterizations.

11. The method of claim 1, wherein characterizing a relative phase offset between the at least one antenna element of the first antenna subarray and the at least one antenna element of the second antenna subarray further comprises compensating for a difference between a distance between the reference antenna element and the at least one antenna element of the first antenna subarray and a distance between the at least one antenna element of the second antenna subarray.

12. A method, comprising:
selecting at least one antenna element of a first antenna subarray of a plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit;
receiving a signal through the at least one antenna element of the first antenna subarray from a calibration antenna;
communicating, by the first slave circuit, the received signal to a master circuit through a first port of the master circuit;
phase adjusting the received signal with a first selected phase;
receiving the signal through the at least one antenna element of the second subarray from the calibration antenna;
communicating, by the second slave circuit, the received signal to the master circuit through a second port of the master circuit;
phase adjusting the received signal with a second selected phase; and
characterizing a relative phase offset between the at least one antenna element of the first antenna subarray and the at least one antenna element of the second antenna subarray, comprising adjusting at least one of the first selected phase and the second selected phase, and monitoring the signal received by the at least one antenna element of the first subarray and the signal received by the at least one antenna element of second subarray.

13. The method of claim 12, further comprising adjusting the first selected phase or the second selected phase at the first slave circuit or the second slave circuit.

14. The method of claim 12, further comprising adjusting the first selected phase or the second selected phase at master circuit.

15. The method of claim 12, further comprising:
characterizing a relative phase offset between a first antenna element of a subarray of the plurality of antenna subarrays and a second antenna element of the subarray.

16. The method of claim 15, further comprising:
characterizing the relative phase offset between a first antenna element of the first antenna subarray and a second antenna element of the second antenna subarray based on:
the characterization of the relative phase offset between the at least one antenna element of the first antenna subarray and the at least one antenna element of the second antenna subarray; and
the characterization of the relative phase offset between the first antenna element of the subarray of the plurality of antenna subarrays and the second antenna of the subarray.

17. The method of claim 12, further comprising characterizing a relative phase offset between a reference antenna element of an antenna subarray of the plurality of antenna subarrays and each other antenna element of the antenna subarray comprising:

selecting a reference antenna element of the antenna subarray;
successively selecting another antenna element of the antenna subarray;
characterizing a relative phase offset between the reference antenna element and each selected other antenna element of the antenna subarray, comprising adjusting a phase delay of the signal received by the reference antenna element or adjusting a phase delay of the signal received from each successively selected other antenna element, and monitoring a signal received at the reference antenna element and each selected other antenna of the antenna subarray while the adjusting the phase delay of the signal received by reference antenna element or adjusting the phase delay of the signal received by each successively selected other antenna element.

18. The method of claim 12, further comprising characterizing a relative phase offset between the at least one antenna element of the first antenna subarray and the at least one antenna element of each of the other antenna subarrays; comprising:
successively selecting the at least one antenna element of each of the other antenna subarrays;
receiving a signal through the at least one antenna element of the first subarray from a calibration antenna;
communicating, by the first slave circuit, the received signal to a master circuit through a first port of the master circuit;
phase adjusting the received signal communicated to the first port with a first selected phase;
receiving the signal through the at least one antenna element each of the successively selected other antenna subarrays from the calibration antenna;
communicating, by a slave circuit associated with each of the successively selected other antenna subarrays, the received signal to the master circuit through each corresponding port of the master circuit;
phase adjusting the received signal communicated to each corresponding port the with a corresponding selected phase; and
characterizing a relative phase offset between the received signal of the at least one antenna element of the first antenna subarray and the receive signal of the at least one antenna element each of the successively selected other antenna subarrays, comprising adjusting at least one of the first selected phase and each corresponding phase, and monitoring the signal received by the at least one antenna element of the first subarray and the signal received by the at least one antenna element each of the successively selected other antenna subarrays.

19. A apparatus, comprising:
a plurality of antenna subarrays, each antenna subarray comprising:
a plurality of antenna elements, each antenna element operative to transmit a corresponding signal;
wherein each antenna element is electrically connected a slave circuit of a plurality of slave circuits;
a master circuit, the master circuit electrically connected to each of the plurality of slave circuits;
one or more controllers operative to:
select at least one antenna element of a first antenna subarray of a plurality of the antenna subarrays and at least one antenna element of a second antenna subarray of the plurality of the antenna subarrays, wherein the first antenna subarray comprises a plurality of antenna elements, and the second antenna subarray comprises a plurality of antenna elements, and wherein the first antenna subarray is electrically connected to a first slave circuit, and wherein the first slave circuit electrically connects a single port of the first slave circuit to each of the plurality of antenna elements of the first antenna subarray, wherein a signal delay of a signal propagating from the single port of the first slave circuit to the at least one antenna element of the first antenna subarray is different than a signal delay of a signal propagating from the single port of the first slave circuit to another antenna element of the first antenna subarray, and the second antenna subarray is electrically connected to a second slave circuit, wherein the second slave circuit electrically connects a single port of the second slave circuit to each of the plurality of antenna elements of the second antenna subarray, wherein a signal delay of a signal propagating from the single port of the second slave circuit to the at least one antenna element of the second antenna subarray is different than a signal delay of a signal propagating from the single port of the second slave circuit to another antenna element of the second antenna subarray;
wherein the single port of first slave circuit is operative to receive a signal from the master circuit through a first port of the master circuit;
wherein the single port of second slave circuit is operative to receive the signal from the master circuit through a second port of the master circuit;
wherein the at least one antenna element of the first subarray is operative to transmit the signal having a first selected phase;
wherein the at least one antenna element of the second subarray is operative to transmit the signal having a second selected phase; and
wherein the one or more controllers are further operative to:
characterize a relative phase offset between the at least one antenna element of the first antenna subarray and the at least one antenna element of the second antenna subarray, comprising adjusting at least one of the first selected phase and the second selected phase, and monitoring a receive signal received at a calibration antenna that includes the transmitted signal of the at least one antenna element of the first antenna subarray and the transmitted signal of the at least one antenna element of second antenna subarray.

20. A apparatus, comprising:
a plurality of antenna subarrays, each antenna subarray comprising:
a plurality of antenna elements, wherein each antenna element is electrically connected to a slave circuit of a plurality of slave circuits;
a master circuit, the master circuit electrically connected to each of the plurality of slave circuits;
one or more controllers operative to:
select at least one antenna element of a first antenna subarray of the plurality of the antenna subarrays and at least one antenna element of a second antenna subarray of the plurality of the antenna subarrays, wherein the first antenna subarray is electrically connected to a first slave circuit and the second antenna subarray is electrically connected to a second slave circuit;

wherein the at least one antenna element of the first antenna subarray is operative to receive a signal from a calibration antenna;

wherein the first slave circuit is operative to communicate the received signal to the master circuit through a first port of the master circuit;

wherein the master circuit is operative to phase adjust the received signal with a first selected phase;

wherein the at least one antenna element of the second subarray is operative to receive the signal from the calibration antenna;

wherein the second slave circuit is operative to communicate the received signal to the master circuit through a second port of the master circuit;

wherein the master circuit is operative to phase adjust the received signal with a second selected phase; and wherein the one or more controllers are further operative to:

characterize a relative phase offset between the at least one antenna element of the first antenna subarray and the at least one antenna element of the second antenna subarray, comprising adjusting at least one of the first selected phase and the second selected phase, and monitoring the signal received by the at least one antenna element of the first subarray and the signal received by the at least one antenna element of second subarray.

\* \* \* \* \*